United States Patent [19]
Janovec et al.

[11] Patent Number: 6,004,422
[45] Date of Patent: *Dec. 21, 1999

[54] MICROSTRUCTURED ARTICLES WITH BACKING AND METHODS OF MANUFACTURE

[75] Inventors: Jeffrey D. Janovec, River Falls, Wis.; James C. Coderre, Lake Elmo, Minn.; James E. Lasch, Oakdale, Minn.; Kenneth L. Smith, White Bear Lake, Minn.

[73] Assignee: 3M Innovative Properties Company, St. Paul, Minn.

[*] Notice: This patent issued on a continued prosecution application filed under 37 CFR 1.53(d), and is subject to the twenty year patent term provisions of 35 U.S.C. 154(a)(2).

[21] Appl. No.: 08/742,329

[22] Filed: Nov. 1, 1996

Related U.S. Application Data

[63] Continuation-in-part of application No. 08/552,079, Nov. 2, 1995, abandoned.

[51] Int. Cl.⁶ .................. B32B 31/26; G02B 5/122
[52] U.S. Cl. .................. 156/276; 428/172; 428/156; 428/913; 428/198; 428/166; 359/529; 359/530; 156/308.2; 156/309.6; 156/290; 442/38; 442/236; 442/286; 442/378; 442/394
[58] Field of Search .................. 428/172, 156, 428/913, 198, 166; 359/529, 530; 156/308.2, 309.6, 290, 276; 442/38, 236, 286, 378, 394

[56] References Cited

U.S. PATENT DOCUMENTS

| | | | |
|---|---|---|---|
| 3,758,192 | 9/1973 | Bingham | 350/105 |
| 4,025,159 | 5/1977 | McGrath | 350/105 |
| 4,576,850 | 3/1986 | Martens | 428/156 |
| 4,588,258 | 5/1986 | Hoopman | 350/103 |
| 5,069,964 | 12/1991 | Tolliver et al. | 428/325 |
| 5,117,304 | 5/1992 | Huange et al. | 359/529 |
| 5,208,098 | 5/1993 | Stover | 428/284 |
| 5,450,235 | 9/1995 | Smith et al. | 359/529 |

FOREIGN PATENT DOCUMENTS

| | | |
|---|---|---|
| 0 372 727 | 6/1990 | European Pat. Off. |
| WO93/10985 | 6/1993 | WIPO |
| WO94/19711 | 9/1994 | WIPO |
| WO95/11464 | 4/1995 | WIPO |
| WO95/11468 | 4/1995 | WIPO |

OTHER PUBLICATIONS

Leighton, J. et al., "RF Welding of PVC and Other Thermoplastic Compounds," *Antec*, 1992, pp. 724–728.
ASTM E 810–94, "Standard Test Method for Coefficient of Retroreflection of Retroreflective Sheeting".
ASTM D 1876–93, "Standard Test Method for Peel Resistance of Adhesives (T–Peel Test)".
Modern Plastics Encyclopedia, vol. 68, No. 11, pp. 350–356.
U.S. Ser. No. 08/236,339.
U.S. Ser. No. 08/434,347.
Patent Abstacts of Japan, vol. 014, No. 035 (P–994), Jan. 23, 1990 & JP 01 271702 A, Oct. 30, 1989.

*Primary Examiner*—William P. Watkins, III
*Attorney, Agent, or Firm*—Robert H. Jordan; Yen Tong-Florczak

[57] ABSTRACT

Microstructured articles of the invention comprising, in order: a) a retroreflective microstructured member; b) a sealing layer melt-bonded to the microstructured member; and c) a backing member. The backing member is a fibrous web comprising a plurality of multifilament strands and is melt-bonded to the second surface of the sealing layer.

16 Claims, 5 Drawing Sheets

MICROSTRUCTURED ARTICLES WITH BACKING AND METHODS OF MANUFACTURE

CROSS-REFERENCE TO RELATED APPLICATION

This is a continuation-in-part of application Ser. No. 08/552,079, filed Nov. 2, 1995 abandoned.

FIELD OF THE INVENTION

The invention relates to microstructured articles (e.g., cube corner type retroreflective sheetings) with backing members.

BACKGROUND

Retroreflective conspicuity articles (e.g., microsphere-based and cube corner or prismatic type retroreflective articles) have been developed for use to increase safety and conspicuity especially during periods of reduced visibility. A wide variety of arrays of cube corners with various geometries have been disclosed. It is known to cover the cube corner elements with a sealing layer to maintain effective retroreflective performance. See, for example, U.S. Pat. No. 4,025,159 (McGrath).

It is desirable that a retroreflective article adhere to a desired substrate for the life of the substrate, or until intentional removal is desired. Difficulties have been encountered in attaching retroreflective sheetings to flexible polymeric substrates, such as highly monomericly plasticized polyvinyl chloride ("PVC") coated fabrics, without interfering with the life and function of the substrates. Articles which use polymer-coated or polymer-sealed fabric materials, such as a trailer tarpaulins and some roll-up signs, typically have a life span of about three to five years and up to about ten years. Roll-up signs are frequently used by road construction crews to designate work zones, road hazards, and the like. Polymer-coated fabric vehicle covers are particularly convenient, permitting the operator of the vehicle to gain access to the inside of trailers quickly and conveniently, and to maintain reasonable weatherproofing. The vehicle operator may open and close the fabric cover many times each day. Therefore the cover should be flexible but strong. Polymer-coated and polymer-sealed fabrics preferably withstand harsh weather conditions as well as the mechanical demands placed on them by the vehicle operator (in the case of trailer tarpaulins) and construction workers (in the case of roll-up signs). Trailer covers and roll-up signs may encounter extremes in temperature, chemical challenges from atmospheric pollution and road salt, and photo-reaction involving infrared, visible, and ultraviolet radiation from sunlight. A retroreflective sheeting attached to such a device preferably remains flexible and weatherproof throughout the expected life span of the article.

Many polymer-coated and polymer-sealed materials comprise a woven fabric layer of polyester, nylon, or cotton, coated or sealed on one or both major surfaces with a polymer preferably suited for the desired use. A commonly used polymer is highly monomericly plasticized PVC. Highly monomericly plasticized PVC is durable and convenient to handle because it is normally melt-bondable to itself or some other compatible polymer with the use of heat or radio frequency (RF) welding. Large fabric materials coated with PVC are manufactured by welding smaller panels together. Torn or damaged PVC coated fabric materials are often repaired while still on the vehicle.

Problems arise when attempting to form a sustainable retroreflective article (as measured by T-peel testing or other similar methods) by melt-bonding a retroreflective sheeting made of polymeric materials which are incompatible (from the standpoint of being incapable of forming a strong and durable melt-bond) with materials typically used for trailer tarpaulins or roll-up signs, such as monomericly plasticized PVC and copolymers of ethylene and comonomers (such as acrylic acid or vinyl acetate). An example of a pair of materials exhibiting melt-bonding compatibility is highly plasticized PVC and polyurethane. An example of a pair of materials having melt-bonding incompatibility is highly plasticized PVC and polycarbonate (a material frequently used in retroreflective sheetings) because of the substantially higher melting temperature of polycarbonate. Another example of a pair of materials having melt-bonding incompatibility is highly plasticized PVC and crosslinked acrylic cube-corners. Monomeric plasticizers present in the tarpaulin typically weaken the melt-bond and cause loss of its cohesive strength.

RF welding accomplishes fusion of polymeric materials through the presence of polar groups converting the radio frequency ("RF") energy into kinetic motion which heats the polymer. When a radio frequency field is applied to a thermoplastic polymer which has pendant polar groups, the ability of the polar groups to switch orientation in phase with the radio frequency determines the degree to which RF energy is absorbed and converted to kinetic motion of the polar group. This kinetic energy is conducted as heat to the polymer molecule; if enough RF energy is applied, the polymer will heat sufficiently to melt. A useful measure in determining the degree to which a polymer will absorb energy from an alternating field is the relation of the polymer's dielectric constant and the dielectric dissipation factor known as the loss factor and is given by the following relationship:

$$N = 5.55 \times 10^{-13} (f)(\Im^2)(K)(\tan \delta) \qquad (1)$$

where N is the electric loss in watts/centimeter$^3$-second ("watts/cm$^3$-sec"), f is frequency in Hertz/sec, $\Im$ or Tau is field strength in volts/cm, K is the dielectric constant, $\delta$ or Gamma is the loss angle, and tan $\delta$ is the dissipation factor.

The dissipation factor is the ratio of the in-phase to out-of-phase power. If the polar groups in a thermoplastic polymer have a relative inability to switch orientations in the RF field, this results in a phase lag known as the dissipation factor. The higher the dissipation factor, the greater the amount of heat a RF field will generate. Studies with thermoplastic polymers and radio frequency welding have demonstrated that thermoplastic polymers with dissipation factors of approximately 0.065 or higher can form useful welds. For example, PVC has a dissipation factor of approximately 0.09 to 0.10 at 1 MHz, nylon caprolactam has a dissipation factor of 0.06 to 0.09 and polycarbonate has a dissipation factor of only 0.01 at the same frequency. The dielectric constants for these three compounds are 3.5, 6.4, and 2.96, respectively, at 1 MHz.

Polyethylene, polystyrene, and polycarbonate have very low dissipation factors and in practical use have poor radio frequency welding capability. Polyvinyl chlorides, polyurethanes, polyamides, and polyesters have reasonably high dissipation factors and have been found in practical use to form very functional RF welds. Reference is made to the article "RF Welding of PVC and Other Thermoplastic Compounds" by J. Leighton, T. Brantley, and E. Szabo in ANTEC 1992, pps. 724–728. These authors did not attempt to weld polycarbonate to the other polymers because of the understanding in the art that a useful weld, using RF energy, would always fail to form.

Only those polar groups within the RF field will be put into motion and thus subject to heating. In addition, RF fields can be applied in well defined zones or fields as compared to thermal heat application methods. As a result RF welding techniques can be used to readily achieve melt-bonds in desired locations with little need for thermal insulation.

PCT Application No. WO 93/10985 (Oppenhejm), published Jun. 10, 1993, discloses, inter alia, attaching PVC retroreflective articles to a tarpaulin cloth coated with PVC using RF welding. This composite article can then be hot air fused to a tarpaulin vehicle cover also coated with PVC. To thermally weld the PVC coated cloth to the PVC coated tarpaulin cover, the two surfaces are heated with air at approximately 400° C. to 600° C. and the surfaces then pressed together to accomplish the hot air fusion. The purpose of the intermediate tarpaulin cloth attachment is to provide thermal insulation between the hot air and the retroreflective article attached to the tarpaulin cloth to prevent thermal melting, loss of retroreflection, and destruction of the retroreflective article.

A commercially available product from Reflexite Corporation, believed to have the designation 393-2457-372, comprises cube corner retroreflective sheeting having PVC cube corners, the cube corners melt-bonded to a PVC-coated fabric. Cube corner retroreflective articles having the cube-corners constructed from PVC have relatively low coefficients of retroreflectivity, generally on the order of 250 candelas/lux/square meter or less for clear, colorless sheeting.

Assignee's U.S. application Ser. No. 08/236,339, filed May 2, 1994 abandoned, and Ser. No. 08/434,347, filed May 2, 1995, pending describe a high brightness, flexible, durable, retroreflective article comprising a polymeric cube corner type retroreflective layer having a polymeric compatibilizing layer for attachment to a flexible polymer-coated fabric material. The retroreflective sheeting comprises, in order: a polymeric cube corner retroreflective layer, a polymeric compatibilizing layer, and a flexible polymeric coated fabric, wherein the coated fabric has a non-compatible polymeric coating on each major surface. In these constructions there is thus always at least one non-compatible polymer layer between the fabric and the retroreflective layer. The compatibilizing layer is a polymeric material having characteristics suitable for bonding to both the retroreflective layer and a polymer-coated or polymer-sealed fabric material under conditions using high frequency welding and/or patterned thermal welding. All methods of making these retroreflective articles involve providing a separate polymer-coated fabric having the fabric portion completely engulfed on both major surfaces with a non-compatible polymer, and thereafter heat or RF welding all three layers together. The use of a separate polymeric compatibilizing layer and a non-compatible coated fabric layer increases cost as well as the thickness of such articles, therefore tending to reduce their flexibility and yielding articles having higher bending radii. It would be highly desirous if retroreflective articles could be produced which do not degrade in retroreflectivity or adherence of the retroreflective layer to the substrate with time, remain flexible by virtue of decreased thickness, and preferably are less expensive and easier to produce.

SUMMARY OF THE INVENTION

The present invention provides flexible microstructured articles with backing members. In a typical embodiment, the article is a cube corner type retroreflective article. The backing member provides desired reinforcement and protection to the microstructured member, and in some embodiments provides means to secure the article to a desired substrate. Articles of the invention can exhibit surprising combinations of desired flexibility, durability, and low cost.

In brief summary, microstructured articles of the invention comprise:.

(a) a microstructured member that comprises (1) a body layer and (2) a microstructured layer comprising an array of microstructured elements, wherein at least one of the microstructured elements and the portion of the body layer closest to the microstructured layer comprises a first polymer (sometimes referred to herein as a first functional bonding polymer);

(b) a sealing layer having first and second surfaces and comprising a second polymer (sometimes referred to herein as a second functional bonding polymer) on at least the first surface thereof, at least a portion of the first surface of the sealing layer being melt-bonded to the first polymer portion of the microstructured member; and (c) a backing member, the backing member comprising a fibrous web comprising a plurality of multifilament strands comprising a third polymer (sometimes referred to herein as a third functional bonding polymer) and having first and second sides, the first side of the web being melt-bonded to the second surface of the sealing layer. As discussed below, the backing member may optionally further comprise a strand encapsulating member (sometimes referred to herein as a matrix layer). By "functional bonding polymer" it is meant that the subject polymeric member has some function in addition to bonding to another member as indicated herein. For instance, in some embodiments the microstructured elements might comprise polycarbonate and in use the polymer provides necessary dimensional stability and desired light refraction and reflection. The polymeric sealing layer is a self supporting film or sheet that imparts certain tensile and tear strength properties to the article while protecting the microstructured elements from undesired contact with outside agents. In both of these embodiments, the subject polymer serves some function in addition to merely providing adhesion to another member. A polymer adhesive that merely serves to bond two other members together would not be considered a functional bonding polymer.

The fibrous web in the backing member is made up of a plurality of multifilament strands that, as discussed below, are not saturated with encapsulating resin. As a result, the individual strands remain more flexible and the resultant web and article exhibit greater flexibility and greater tear strength.

In some embodiments, the invention provides retroreflective articles useful in numerous applications, for example, but not limited to, use in articles of clothing for safety or fashion or accessories such as a personal bag or back pack, use for articles for pets and other animals, as well as signs such as road signs and roll up signs, flexible vehicle covers, tarpaulins, warning tapes, and conspicuity markings. These materials may also be useful in decorative and structural webbing for displaying graphic designs and logos as well as providing patches for attachment to such articles. Articles of the invention can provide heretofore unattained combinations of high flexibility and conformability, tear strength, tensile strength, and cohesive durability.

Briefly summarizing, the method of the invention comprises:

(a) providing a microstructured member that comprises (1) a body layer and (2) a microstructured layer comprising an array of microstructured elements, wherein at least one of the microstructured elements and the portion of the body layer closest to said microstructured layer comprises a first polymer; and (b) providing a sealing layer having first and second surfaces and comprising a second polymer, and melt-bonding at least a portion of the first surface of the sealing layer to the first polymer portion of the microstructured member;

(c) providing a backing member, the backing member comprising a fibrous web comprising a plurality of multifilament strands comprising a third polymer and having first and second sides; and (d) melt-bonding the first side of the web to the second surface of the sealing layer.

BRIEF DESCRIPTION OF THE DRAWING

The invention will be further explained with reference to the drawing, wherein.

These figures, which are idealized, are not to scale and are intended to be merely illustrative and non-limiting.

DESCRIPTION OF ILLUSTRATIVE EMBODIMENTS

As outlined above, microstructured articles of the invention comprise, in order:

(a) a microstructured member comprising (1) a body layer and (2) a microstructured layer comprising an array of microstructured elements, wherein at least one of the microstructured elements and the portion of the body layer closest to the microstructured layer comprises a first polymer;

(b) a sealing layer having first and second surfaces and comprising a second polymer on at least the first surface thereof, at least a portion of the first surface of the sealing layer being melt-bonded to at least a portion of the first polymer of the microstructured member; and (c) a backing member, the backing member comprising a fibrous web comprising a plurality of multifilament strands comprising a third polymer and having first and second sides, the first side of the web being attached to the second surface of the sealing layer. The fibrous web in the backing member is made up a plurality of multifilament strands that are substantially not saturated with encapsulating resin.

As used herein, the term "microstructured member" refers to a member comprising a body layer and a microstructured layer. The body layer may be made up of a single layer or a composite of more than one layer. The body layer typically functions to protect the microstructured article from the environmental elements and/or to provide significant mechanical integrity to the microstructured member. The microstructured layer is disposed on one side of the body layer. The microstructured layer comprises an array of microstructured elements, e.g., cube corner elements that provide retroreflective properties, and may optionally comprise a layer that connects or ties the microstructured elements together. In a typical replication process, the array of elements are connected together by a layer of the same material as the elements which is sometimes referred to as a land layer. In some embodiments of the invention, the land layer and body layer are the same member, in other embodiments they will be different layers of the same material or different layers of different materials that are bonded together.

The microstructured member will be selected in large part based upon the properties desired of the resultant article. Illustrative examples include surfaces having an array of cube corner elements protruding therefrom as in the case of retroreflective articles and surfaces having an array of parallel prisms protruding therefrom as in the case of some optical products. As will be understood by those skilled in the art, other microstructured surfaces can be used in articles of the invention as desired.

FIGS. 1a–d depict various constructions of retroreflective layers known in the prior art which can be used in some embodiments of the present invention if desired.

Figures 1A, 1B, 1C, 1D:
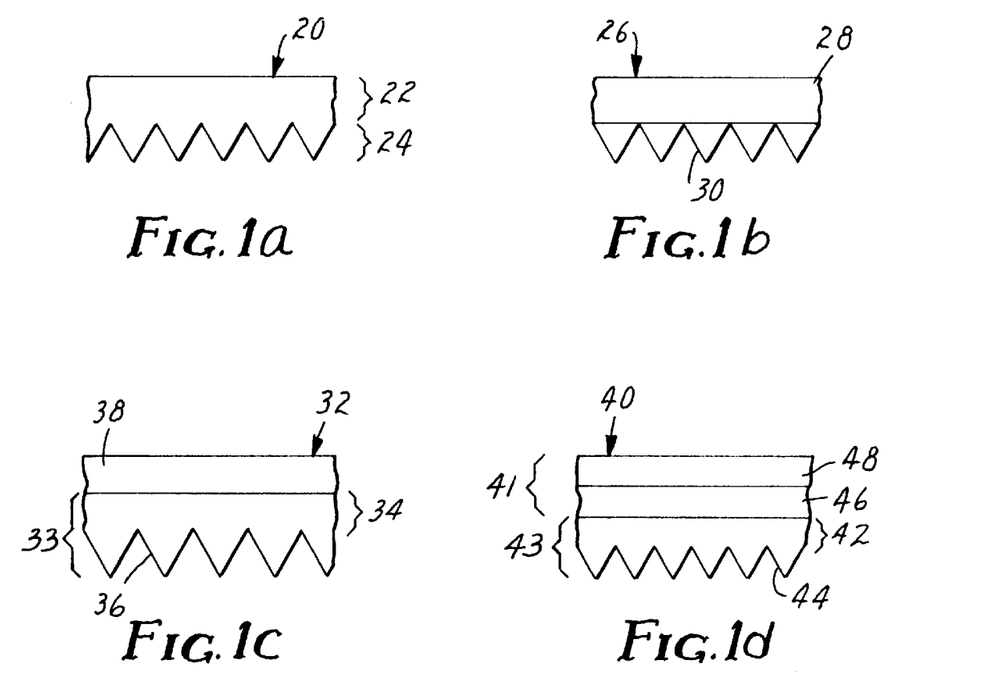
FIGS. 1a, 1b, 1c and 1d are cross sectional views of various illustrative constructions of retroreflective layers known in the prior art that can be used as microstructured members herein.

In FIG. 1a microstructured member 20 is a single layer retroreflective member comprising land layer 22 and microstructured layer 24 having a plurality of cube corner shaped projections.

In FIG. 1b microstructured member 26 is composite retroreflective article comprising body layer 28 and microstructured layer 30. In some embodiments, the polymeric materials used for body layer 28 and microstructured layer 30 comprise different materials. In a preferred example of this embodiment, body layer 28 is polyurethane and microstructured surface 30 are polycarbonate cube-corner projections.

In FIG. 1c, microstructured member 32 comprises (1) microstructured layer 33 that comprises microstructured elements 36 and land 34 and (2) body layer 38.

In FIG. 1d microstructured member 40 comprises microstructured layer 43 and body layer 41. Body layer 41 comprises multiple layers 46 and 48. In a preferred embodiment, layer 46 is a structural overlay and layer 48 is a protective overcoat. Microstructured layer 43 comprises land layer 42 and microstructured elements 44.

Those skilled in the art will be able to select suitable body layers and microstructured layers for particular applications.

In some preferred retroreflective embodiments of the invention, the microstructured member is a highly flexible cube corner type retroreflective sheeting. One illustrative example suitable for use herein is the sheeting disclosed in Assignee's European Patent Application No. 94.931935.4 (Bacon et al.), filed Oct. 20, 1994, via PCT Application No. US94/11945. This application discloses conformable sheetings comprising a plurality of discrete cube corner segments which are conformably bonded together, each cube corner segment comprising a body portion having a substantially planar front major surface and at least one minute cube corner retroreflective element projecting rearwardly from the body portion and defining a cube corner point side of the cube corner segment. Another illustrative sheeting suitable for use herein is the flexible sheeting disclosed in European Patent Application No. 95.900384.9 (Benson et al.), filed Oct. 20, 1994, via PCT Application No. US94/11940. This sheeting comprises: a) a two dimensional array of substantially independent crosslinked cube corner elements, the array comprising a first polymeric material, and b) an overlay film having two major surfaces and comprising of a second polymeric material, the array being bonded to the first major surface of the overlay film. In these embodiments, the sealing layer is formed into contact with the overlay film between cube corner elements and is melt-bonded to the overlay film.

Those skilled in the art will be able to readily select these and other suitable microstructured members for use in accordance with the present invention.

The polymer of the microstructured elements is selected in view of the properties desired of the resultant article, the means used for forming the microstructured features, the bondability to the second polymer of the sealing layer, and the nature of any other components of the microstructured member. The polymer may be thermoplastic or thermoset resin as desired.

In retroreflective embodiments of the invention, the microstructured member preferably exhibits high retroreflective brightness, i.e., has a high coefficient of retroreflectivity. Retroreflectivity of the sheetings expressed as the Coefficient of Retroreflection, $R_A$, in units of candelas/lux/square meter is determined using standardized test ASTM E 810-93b. Typically, retroreflective embodiments of the invention exhibit a coefficient of retroreflectivity of at least about 250, preferably greater than about 400, and more preferably greater than about 600, candelas/lux/square meter at an observation angle of 0.2° and entrance angle of −4° for the average of 0° and 90° orientation angles. Such rigorous brightness criteria precludes as unsuitable PVC cube corner elements due to the unsuitability of PVC to provide a high coefficient of retroreflectivity for any length of time. This is principally due to the use of the monomeric plasticizers within the PVC of the retroreflective layer and the fact that PVC materials are not sufficiently dimensionally stable.

Several factors are important in attaining high retroreflective brightness. For example, the polymer forming the microstructured surface should be substantially optically clear (it may be colored as desired) whether the sealing layer is melt-bonded to the surface or not. Also, the polymer should form cube corner elements that are dimensionally stable so that precise geometry desired for retroreflection is maintained.

Useful polymeric materials for the microstructured member of the present invention preferably are able to transmit at least 70 percent of the light incident upon the polymer at a given wavelength, for wavelengths ranging from about 400 to about 700 nanometers. More preferably, the polymers have a light transmissibility of greater than 80 percent, and most preferably greater than 90 percent at these wavelengths.

Illustrative examples of thermoplastic polymers that may be used as the first functional bonding polymer in microstructured members of the invention include acrylic polymers such as poly(methylmethacrylate); polycarbonates; cellulosics; polyesters such as poly(butyleneterephthalate); poly(ethyleneterephthalate); fluoropolymers; polyamides; polyetherketones; poly(etherimide); polyolefins; poly(styrene); poly(styrene) co-polymers; polysulfone; urethanes, including aliphatic and aromatic polyurethanes; and mixtures of the above polymers such as a poly(ester) and poly(carbonate) blend, and a fluoropolymer and acrylic polymer blend. For example, some heat resistant thermoplastic aliphatic urethanes that can be used herein are disclosed in U.S. Pat. No. 5,117,304 (Huang et al.).

Other illustrative polymer materials include reactive resin systems capable of being crosslinked by a free radical polymerization mechanism by exposure to actinic and/or particle radiation, for example, electron beam, ultraviolet light, or visible light. Additionally, these materials may be polymerized by thermal means with the addition of a thermal initiator such as benzoyl peroxide. Radiation initiated cationic polymerizable resins also may be used.

Reactive resins suitable for forming the microstructured layer and use as first functional bonding polymers may include blends of photoinitiator and at least one compound bearing an acrylate group. Preferably the resin blend contains a monofunctional, a difunctional, or a polyfunctional compound to ensure formation of a crosslinked polymeric network upon irradiation.

Illustrative examples of resins suitable for use herein that are capable of being polymerized by a free radical mechanism include acrylic-based resins derived from epoxies, polyesters, polyethers, and urethanes, ethylenically unsaturated compounds, aminoplast derivatives having at least one pendant acrylate group, isocyanate derivatives having at least one pendant acrylate group, epoxy resins other than acrylated epoxies, and mixtures and combinations thereof. The term acrylate is used here to encompass both acrylates and methacrylates. U.S. Pat. No. 4,576,850 (Martens) discloses examples of cross-linked resins that may be used in forming the peaks of the retroreflective layer of the present invention.

Ethylenically unsaturated resins useful herein include both monomeric and polymeric compounds that contain atoms of carbon, hydrogen, and oxygen, and optionally nitrogen, sulfur, and halogens. Oxygen or nitrogen atoms, or both, are generally present in ether, ester, urethane, amide, and urea groups. Ethylenically unsaturated compounds preferably have a molecular weight of less than about 4,000 and preferably are esters made from the reaction of compounds containing aliphatic monohydroxy groups, aliphatic polyhydroxy groups, and unsaturated carboxylic acids, such as acrylic acid, methacrylic acid, itaconic acid, crotonic acid, isocrotonic acid, maleic acid, and the like.

Illustrative examples of photopolymerization initiators which can be blended with acrylic compounds for use herein include: benzil, methyl o-benzote, benzoin, benzoin ethyl ether, benzoin isopropyl ether, benzoin isobutyl ether, etc., benzylphenone/tertiary amine, acetophenones such as 2,2-diethoxyacetophenone, benzyl methyl ketal, 1-hydroxycyclohexylphenyl ketone, 2-hydroxy-2-methyl-1-phenylpropin-1-one, 1-(4-isopropylphenyl)-2-hydroxy-2-methylpropan-1-one,2-benzyl-2-N,N-dimethylamino-1-(4-morpholinophenyl)-1-butanone, 2,4,6-trimethylbenzoyldiphenylphosphine oxide, 2-methyl-1-4 (methylthio), phenyl-2-morpholino-1-propinone, etc. These compounds may typically be used individually or in combination.

Illustrative examples of cationicly polymerizable materials suitable for use herein include materials containing epoxy and vinyl ether functional groups. These systems are photoinitiated by onium salt initiators such as triarylsulfonium, and diaryliodonium salts.

Preferred polymers for forming the array of cube corner elements in retroreflective embodiments of the invention include poly(carbonate), poly(methylmethacrylate), poly(ethyleneterephthalate), aliphatic polyurethanes and cross-linked acrylates such as multifunctional acrylates or epoxies and acrylated urethanes blended with mono-and multifunctional monomers. These polymers are preferred for one or more of the following reasons: thermal stability, environmental stability, clarity, excellent release from the tooling or mold, and capability of receiving a reflective coating.

Many of the above-mentioned polymers for use in forming the microstructured surface will not form adequate bonds directly to highly plasticized PVC or ethylene copolymers such as EAA. Furthermore, these microstructured surfaces may be subject to degradation due to migration and deposition of monomeric plasticizers from plasticized PVC material either from direct contact or as a vapor. One of the advantages of the present invention is that the sealing layer may function as a barrier to monomeric plasticizer migration from fibrous materials having plasticized PVC coatings to the retroreflective elements. Another advantage is that the sealing layer can permit incorporation of fibrous webs and matrix layers that are compatible or incompatible with the microstructured member.

The sealing layer is melt-bonded to the microstructured member either to the body layer or to the microstructured surface or both. Typically in the case of a retroreflective embodiment, the sealing layer is melt-bonded to the microstructured member in a network of interconnecting bond lines to form an array of sealed cells containing a plurality of cube corner elements. As discussed in U.S. Pat. No. 4,025,159 (McGrath), such network of bonds and the body of the sealing layer provide hermetically sealed cells of retroreflective elements in which an air interface on the surfaces of the cube corner elements is maintained. In some embodiments, the microstructured surface may be metallized and the sealing layer may be melt-bonded to the metal surface substantially continuously or in discontinuous fashion.

In addition, the sealing layer functions to bond the microstructured member to the backing member via melt-bonding, e.g., high frequency welding and/or patterned thermal welding.

An advantage of the invention is that the sealing layer may be first melt-bonded to the microstructured member in desired pattern, taking into account possible effects of the sealing pattern on the desired appearance of the member from the front surface, desired retroreflective performance of the resultant article, etc., and then subsequently melt-bonded to the backing member substantially without disturbing the melt-bond to the microstructured member. This permits separate optimization of both interfaces and optimization of the final product. For example, the sealing layer may be melt-bonded to the microstructured surface in a plurality of separate points or in an interconnecting network of bonds such as is disclosed in U.S. Pat. No. 4,025,159 (McGrath) so as to minimize disruption of the microstructured surface (unless the surface is metalized, the regions to which the sealing layer is melt-bonded are optically disrupted so as to reduce the retroreflective effect of the sheeting), while the sealing layer is substantially completely melt-bonded to the backing member over substantially its entire surface to provide a strong cohesive interfacial bond. If desired, the sealing layer might be bonded to the backing member in a pattern, e.g., point bonds, or a network of bonds, that is different from the pattern in which the sealing layer is melt-bonded to the microstructured surface.

The second polymer of the sealing layer is compatible with the first polymer of the microstructured member, i.e., the two can be melt-bonded together without undesirably degrading the microstructured features of the microstructured member. Preferably the sealing layer will provide a bond between the microstructured member and the backing member characterized by an average T-peel force (measured in accordance with the test method described in the Examples below) of at least about 0.2 $lbs_f$ (0.9 Newtons), more preferably at least about 0.8 $lb_f$ (3.6 Newtons), more preferably greater than about 2 $lbs_f$ (9 Newtons).

A sometimes desired property of the sealing layer is that the second polymer act as a barrier to the migration of monomeric plasticizers, e.g., such as might migrate from a PVC coated flexible fabric material to which the retroreflective article is attached. Barriers will retard or eliminate the migration of monomeric plasticizer to the microstructured surface, preserving desired performance of the resultant article.

Illustrative examples of polymers suitable for use in a sealing layer include polyurethanes, alkylene/alkyl acrylate copolymers such as ethylene/methyl acrylate copolymer, ethylene/N-butyl acrylate copolymer, ethylene/ethyl acrylate copolymer, ethylene/vinyl acetate copolymers, polymerically plasticized PVC, and polyurethane primed ethylene/acrylic acid copolymer. Blends of such materials may be used if desired. Those skilled in the art will recognize that the term "polyurethane" typically includes polymers having urethane and/or urea linkages, and such is the intended meaning herein, and includes polyether polyurethanes, polyester polyurethanes, and polycarbonate polyurethanes. An illustrative example of a suitable EAA material for use in the invention is that known under the trade designation PRIMACOR Brand 3440, from Dow Chemical Company, Midland Mich., which is a copolymer of ethylene and acrylic acid, the latter present at a weight percentage of about 9 percent as a percentage of the total weight of ethylene and acrylic acid monomer, the copolymer having a melt index of about 10. Polymerically plasticized PVC is considered a distinctly different material from monomericly plasticized PVC because polymeric plasticizers will not migrate from PVC. Polymerically plasticized PVC will remain flexible and will not cause a deterioration in the optical performance of the retroreflective layer.

Suitable polyurethanes for use as sealing layers include polyether polyurethanes, polyester polyurethanes, polycarbonate polyurethanes, all of which may be aliphatic or aromatic in nature, and blends of these. A suitable blend comprises from about 50 to about 99 weight percent aliphatic polyester polyurethane with about 1 to 50 weight percent of a pigmented aromatic polyether polyurethane. One example of a suitable blend is that of 60 weight percent of the aliphatic polyester polyurethane known under the trade designation MORTHANE Brand PNO3.214, from Morton International, Seabrook, N.H. with 40 weight percent of a pigmented aromatic polyether polyurethane. The pigmented aromatic polyether polyurethane is comprised of 50 weight percent aromatic polyether polyurethane known under the trade designation ESTANE Brand No. 58810, available from B.F. Goodrich Co., Cleveland, Ohio, and 50 weight percent titanium dioxide, previously compounded by suitable means, such as in a twin screw extruder, and subsequently pelletized. Another illustrative example of a suitable polyurethane may be prepared by twin screw compounding about 1 to about 50 weight percent of titanium dioxide directly into an aliphatic polyurethane such as MORTHANE Brand PNO3.214.

A useful ethylene/vinyl acetate ("EVA") copolymer is that known under the trade designation ULTRATHANE UE Brand 646-04 from Quantum Chemical Company, Cincinnati, Ohio. Those skilled in the art will be able to determine via T-peel tests that ethylene copolymers with higher comonomer contents and melt indexes are more readily melt-bonded. However, at very high melt indexes and/or comonomer contents it is seen that melt-bond strengths decrease.

In some article embodiments within the invention, a multilayer sealing layer may be used. An illustrative example of a multilayer version is an ethylene/vinyl acetate copolymer ("EVA") layer coated onto an ethylene/acrylic acid copolymers ("EAA") layer, wherein the EAA layer is disposed against the backing member and the EVA layer has from about 15 to about 50 mole percent vinyl acetate ("VA"), more preferably from about 30 to about 50 mole percent VA. One layer may be selected for plasticizer barrier properties and/or adhesion to the reinforcing member and the other layer for adhesion to the microstructured surface.

The backing member comprises a fibrous web having a plurality of multifilament strands polymer and having first and second sides, the first side of the web being melt-bonded to the second surface of the sealing layer. The fibrous web in the backing member is made up a plurality of multifilament strands that are substantially not saturated with encapsulating resin. Each strand comprises a plurality of filaments that may be entwined or twisted together or not as desired. The filaments in a strand may be of substantially equal cross sectional diameter or varying diameter as desired. The various strands in a given backing member may be substantially uniform or different in diameter, number of filaments, length, composition of filaments, etc. as desired.

The strands preferably comprise at least seven filaments, more preferably 15 or more filaments, and still more preferably about 30 or more filaments. At least some of the filaments within a strand are free to move with respect to one another, i.e., the filaments are not wound together so tightly, or bonded together, or the interstices within the strand not saturated with resin (e.g., of the sealing layer or matrix layer), so as to prevent independent movement. As a result, the strand is more flexible, imparting greater flexibility to the resultant article of which it is a part. During melt-bonding of the sealing layer to the backing member, the strands are not saturated by sealing layer material, if the sealing layer is contacted directly to the fibrous web, or matrix layer if completely embedded therein, thereby retaining more flexibility in accordance with the invention.

Figure 2:
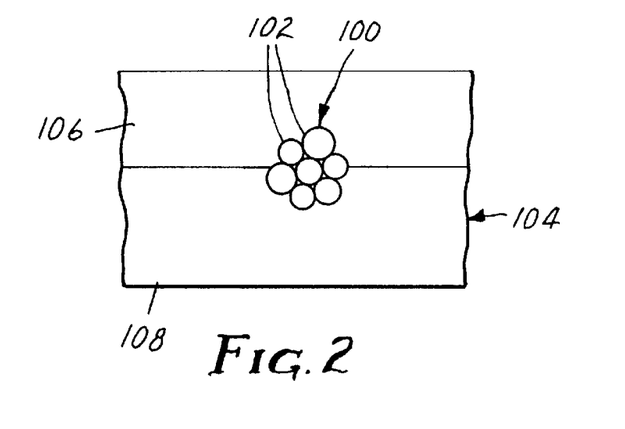
FIG. 2 is an end view of an illustrative multifilament strand in a backing member of the invention.

FIG. 2 illustrates a cross section of strand 100 comprising a plurality of filaments 102 in backing member 104 to which sealing layer 106 has been melt-bonded. In addition to strand 100, backing member 104 further comprises matrix layer 108. In accordance with the invention, surrounding polymeric materials are bonded to the strand but do not penetrate the interior portions thereof such that at least some of the individual filaments remain free to move independently of one another.

Illustrative examples of suitable fibrous webs for use in or as backing members herein include woven, non-woven and knitted fabrics, and webs of loose fibers, all of which may comprise one or more of polyamide, polyester, and cellulosic fiber. Suitable backing members have basis weights (uncoated) ranging from about 0.5 to about 20 ounces/square yard (about 17 to about 680 grams/square meter (gsm)), depending on the flexibility desired for the resultant article.

Figure 3:
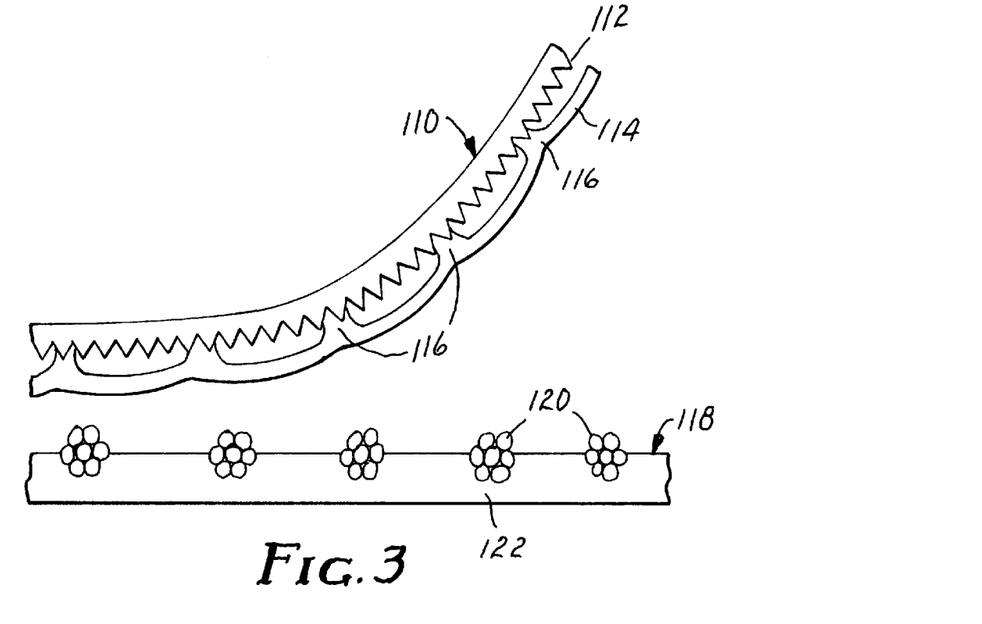
FIGS. 3 and 4 are each a cross sectional view of a portion of an article of the invention during melt-bonding.
Figure 4:
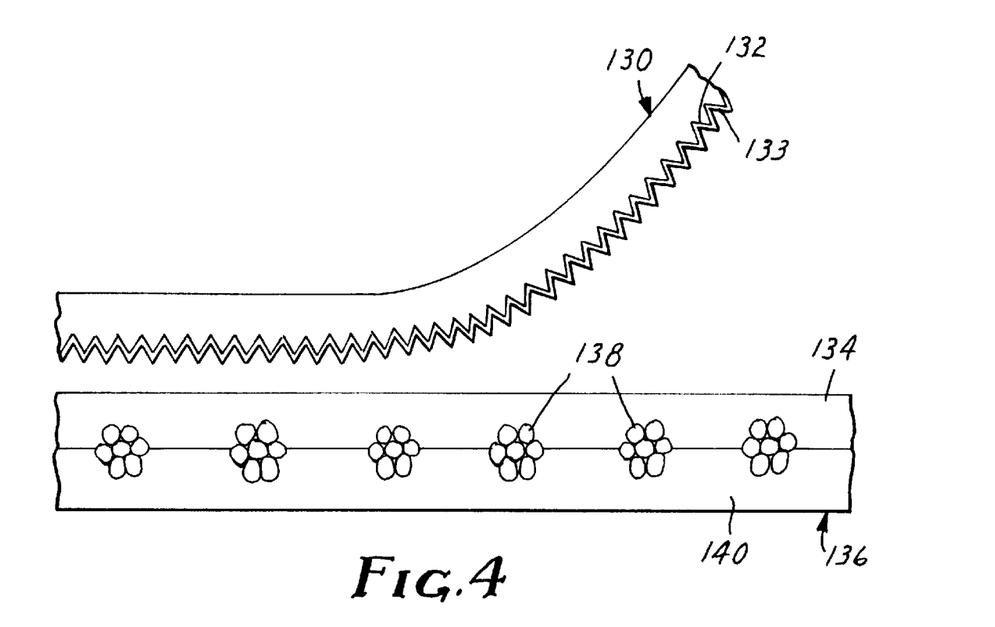

The fibrous web and/or matrix layer, if present, may comprise polymeric materials that are incompatible with the first polymer of the microstructured member, i.e., polymeric materials that cannot be melt-bonded thereto, if desired. The fibrous web may be such that it will melt-bond to the sealing layer and/or matrix layer. However, typically the fibrous web will at most only weakly melt-bond or substantially will not melt-bond thereto, leaving the filaments able to move more freely. With the fibrous web encapsulated between the sealing layer and matrix layer as shown in FIGS. 2–4 and a strong melt-bond between the sealing layer and matrix layer, structural integrity of the composite article is maintained. The fibrous web can impart great tear strength, tensile strength, etc. to the composite article in accordance with the invention without being strongly bonded to the surrounding components of the article.

PVC is typically used on truck tarpaulins, roll-up signs, and the like, and provides good flexibility, resistance to abrasion, stability to ultraviolet rays, and performance in cold temperatures. But PVC is also typically highly plasticized with monomeric plasticizers in order to attain good flexibility, typically up to 30 to 40 percent by weight of monomeric plasticizers. As discussed in U.S. Pat. No. 5,069,964 (Tolliver), such plasticizer may degrade retroreflective performance of cube corner type retroreflective articles if it migrates or penetrates through the article. An advantage of the present invention, is that the sealing layer or matrix layer of the backing member can be selected to be a barrier to monomeric plasticizers if desired.

An alternate useful polymeric material for truck tarpaulins, roll-up signs and the like is ethylene/acrylic acid copolymer. Like the PVC polymer, EAA is flexible, durable, and resistant to abrasion. However, EAA films maintain flexibility without the need for plasticizers. Other flexible ethylene copolymers, for example EVA or ethylene/n-butyl acrylate copolymer, may also be used for coating one outer surface of the fabric.

As briefly summarized above, the method of the invention method comprises:

(a) providing a microstructured member that comprises (1) a body layer and (2) a microstructured layer comprising an array of microstructured elements, wherein at least one of the microstructured elements and the portion of the body layer closest to said microstructured layer comprises a first polymer; and (b) providing a sealing layer having first and second surfaces and comprising a second polymer, and melt-bonding at least a portion of the first surface of the sealing layer to the first polymer portion of the microstructured member; and (c) providing a backing member, the backing member comprising a fibrous web comprising a plurality of multifilament strands comprising a third polymer, and optionally a strand encapsulating member, and having first and second sides; and (d) bonding the first side of the web to the second surface of the sealing layer; to yield a flexible microstructured article with backing member.

Figure 8A:
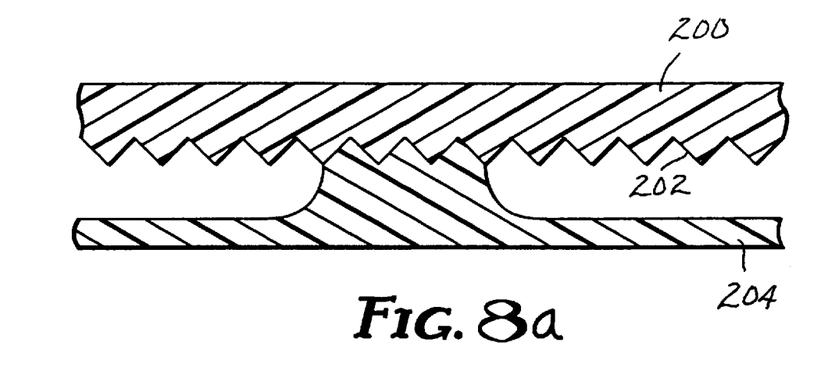
FIGS. 8a and 8b are cross sectional views of bonds between the sealing layer and two different microstructured members of two illustrative embodiments of the invention.
Figure 8B:
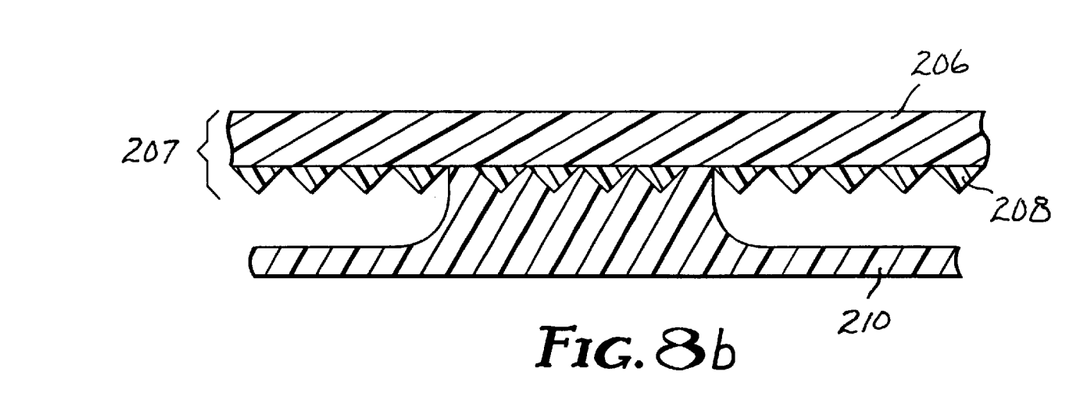

As shown in FIG. 8a, in some embodiments, sealing layer 204 will be bonded to microstructured surface 202 of microstructured member 200, i.e., microstructured surface 202 comprises the first polymer to which the second polymer of sealing layer 204 will bond. As shown in FIG. 8b, in some embodiments, sealing layer 210 will be bonded to body layer 206 of microstructured member 207, being pushed into contact therewith between the microstructure elements 208 of the microstructured surface. In this instance, the portion of body layer 206 closest to the microstructure elements comprises the first polymer to which the second polymer of sealing layer 210 will bond.

In accordance with the invention, the sealing layer may be first melt-bonded to the microstructured member in a desired pattern and then subsequently melt-bonded to the backing member in a different pattern substantially without disturbing the melt-bond to the microstructured member (as shown in FIG. 3). In some embodiments, the microstructured member will be melt-bonded to the sealing layer, and the sealing layer melt-bonded to the backing member simultaneously. In still other embodiments, the sealing layer will be first melt-bonded to the backing member and then melt-bonded to the microstructured member (as shown in FIG. 4).

Referring to FIG. 3, microstructured member 110 with microstructured surface 112 (e.g., polycarbonate) to which sealing layer 114 (e.g., urethane) has been melt-bonded at a plurality of melt-bond points 116 is to be melt-bonded to backing member 118 comprising fibrous web 120 and matrix layer 122 (e.g., urethane).

Referring to FIG. 4, microstructured member 130 with microstructured surface 132 (e.g., polycarbonate) which has been metalized with reflective layer 133 (e.g., aluminum vapor coat) is being melt-bonded to sealing layer 134 (e.g., EAA) which has been melt-bonded to backing member 136 comprising fibrous web 138 and matrix layer 140 (e.g., urethane).

In some typical embodiments, the microstructures have a height or depth of about 3.5 mils (85 microns), the sealing layer a thickness of about 2.5 mils (62 microns), the strands of the fibrous web have a thickness of about 5 to 7 mils (125 to 175 microns) or so, and the matrix layer a thickness of about 4 mils (100 microns). It will be understood, however, that components with other dimensions than these may be used in accordance with the invention. Typically it is preferred that the sealing layer be at least $\frac{2}{3}$ as thick as the depth of the microstructures on the microstructured surface. If the strands are too thick, the resultant article will tend to be less flexible; if they are too thin the article will tend to have lower tear strength. If the matrix layer is too thin, the fibrous web may not be secure enough in the resultant article. If any of the components are too thick, the resultant article may not exhibit desired flexibility.

Melt-bonding techniques that can be used herein include high frequency welding (e.g., radio frequency welding and ultrasonic welding) thermal application, thermal extrusion, heat lamination, and the like.

For example, a suitable retroreflective microstructured surface is selected having a plurality of polymeric microstructures which are normally incompatible for direct thermal attachment to non-compatible polymers such as monomerically plasticized PVC or EAA. A sealing layer/backing member composite is selected, having an integral sealing layer coated on one side thereof and in some instances a non-compatible polymeric layer sandwiching the fibrous material. At least a portion of the microstructured surface and at least a portion of the sealing layer side are contacted together and exposed to high frequency energy, such as radio frequency, in most cases under pressure, or by passing though a heated nip. The frequency of the energy, the field strength, the location (top or bottom), the time, and gap are variable by an operator and chosen for suitability dependent upon the polymeric components. The choice depends on such factors as the individual polymeric dielectric loss factors, dielectric constants, melting temperatures, and layer thickness. The radio frequency energy is delivered through antennas mounted within appropriate platens that are pressed onto the appropriate surfaces of the composite article applying an appropriate amount of pressure and an appropriate duration of high frequency energy. A general description of radio frequency welding is given in *Modern Plastics Encyclopedia,* 1992 Ed., p. 350–352, (McGraw-Hill).

In thermal welding of a microstructured member and a sealing layer/backing member composite, the two materials are passed between a nip roller and an embossing thermal roller applying a suitable pressure to the components over a raised ridge embossing pattern carried on the surface of the embossing roller. The counter-force nip roller is preferably a sufficiently hard rubber smooth surfaced roller, for example an 85 Shore A durometer roller. The embossing roller is patterned to exert pressure into the material being welded only at the point of the raised ridges. Both the embossing roller and the hard durometer roller are heated to suitable temperatures depending upon the composition of polymers used. The embossing pattern may be of several suitable patterns such a chain linked pattern as described below.

In an alternative method, a compatible sealing layer polymer is coated, preferably by extrusion coating, onto a backing member and allowed to cool, a portion of the sealing layer contacted with the structured surface (metallized or non-metallized) of a microstructured member, and the resulting composite structure exposed to conditions (preferably high frequency welding or thermal nip rollers as explained above) sufficient to melt-bond the sealing layer/backing member composite to the microstructured surface at a plurality of locations.

Ultrasonic welding may be used to achieve melt-bonding in accordance with the invention. In ultrasonic welding, high-frequency mechanical vibrations are transmitted through one of the machine's mating parts to the joint interface. A combination of applied force and surface and intermolecular friction at the joint interface elevates the temperature until the melting point of the material is gained. Force is maintained after vibrations stop and a weld is produced. See *Modern Plastics Encyclopedia* (1992), p. 353–356.

The invention also contemplates microstructured surfaces that are specularly coated with metal and other suitable reflective coatings as a means for altering the optical performance of the microstructured member. The invention anticipates the need to pattern the metallized coatings when using RF welding and to constrain the RF welding to those regions that are void of any metallization. It is recognized that a portion may comprise all of the projection surfaces or less than all of the surfaces.

Figure 5:
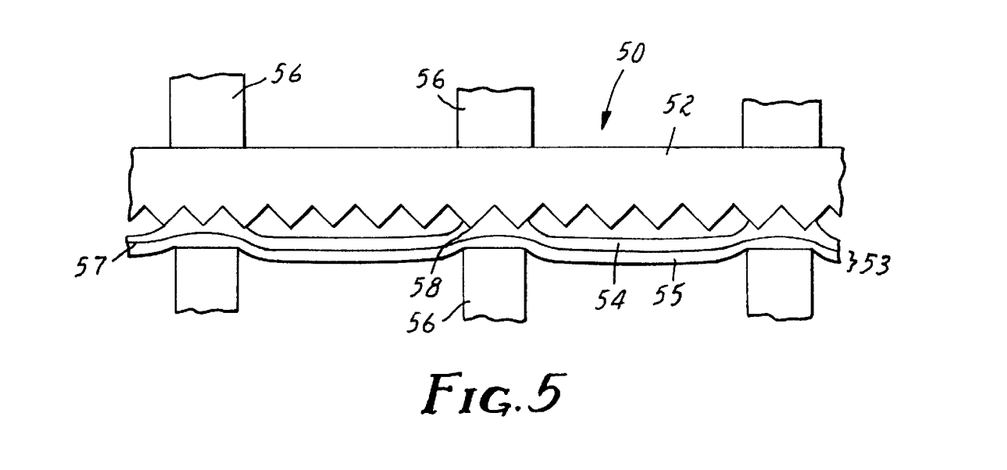
FIG. 5 is a cross sectional view of a high frequency bonding step for producing a retroreflective article of the invention.

FIG. 5 illustrates one embodiment of retroreflective article 50 of the invention comprising retroreflective layer 52 and polymer-coated backing member 53 with sealing layer 54 thereon and comprising PVC layer 55 and fibrous web 57, which have been fused using radio frequency welding energy from platens 56 creating RF weld 58 between retroreflective layer 52 and sealing layer 54.

Figure 6:
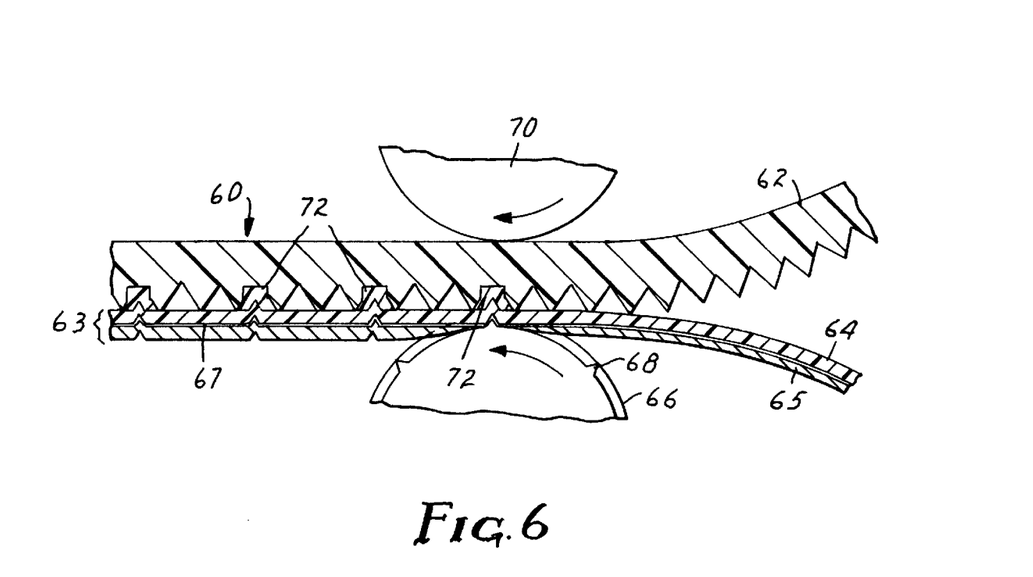
FIG. 6 is a cross sectional view of a thermal attachment step for producing a retroreflective article of the invention.

FIG. 6 illustrates a thermal method of constructing a retroreflective article of the invention 60 comprising retroreflective layer 62 and polymer-coated fabric material 63 with sealing layer 64 and comprising PVC layer 65 and fabric 67 passing between embossing roller 66 and rubber roller 70. Embossing roller 66 comprises patterned raised ridge 68 whereby using heat and pressure between rollers 66 and 70 a thermal weld 72 is formed between retroreflective layer 62 and sealing layer 64 corresponding to the patterned raised ridge 68.

Figure 7:
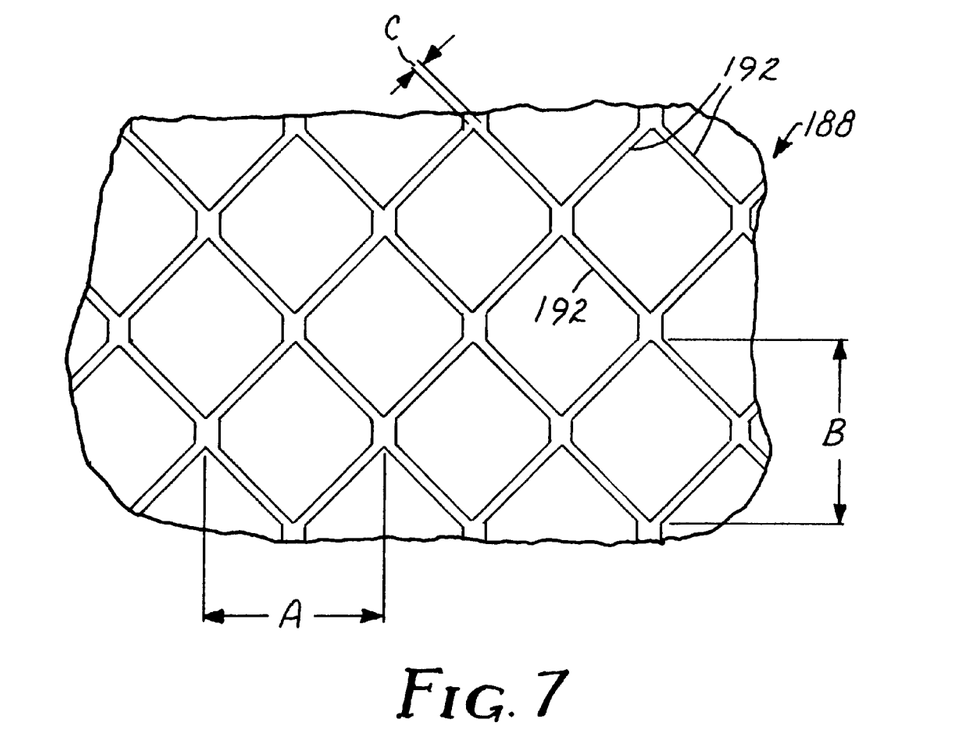
FIG. 7 is a plan view depicting a surface of a representative embossing cylinder useful in the method illustrated in FIG. 6.

FIG. 7 illustrates a plan view of a portion of an embossing roll used to make a chain link patterned article of the invention. Embossing roll 188 has raised embossing elements 192 on its surface for creating a thermal weld pattern in articles of the invention, corresponding to the embossing pattern of raised ridges 192. FIG. 4 depicts a plan view of a raised ridge embossing pattern 192 on the surface of embossing roll 188 showing the pattern dimension measurements A, B, and C. Dimension A preferably ranges from about 4 to about 50 millimeters ("mm"), dimension B preferably ranges from about 4 to about 50 mm, and dimension C preferably ranges from about 0.4 to about 4 mm.

An advantage of the present invention is that articles of the invention can be constructed so as to maintain an excellent degree of flexibility without any cracking or mechanical failure. For example, the sheeting may be wrapped around curved or otherwise non-planar surfaces without damage. In one test, this flexibility was measured by wrapping the microstructured article around a cylindrical mandrel having a 3.2 mm (0.125 inch) diameter. The test was performed at 0° C. with good results, i.e., no visible cracking.

Articles of the invention can be made in highly flexible form for use on flexible substrates, e.g., PVC canvasses, which achieve flexibility using the monomeric plasticizers, while being resistant to degradation, e.g., of optical performance, due to exposure to monomeric plasticizers.

Colorants, UV absorbers, light stabilizers, free radical scavengers or antioxidants, processing aids such as antiblocking agents, releasing agents, lubricants, and other additives may be added to the microstructured member as desired. The particular colorant (e.g., dyes and pigments, optionally fluorescent) selected, of course, depends on the desired color. Colorants typically are added at about 0.01 to 1 weight percent. UV absorbers typically are added at about 0.5 to 2 weight percent. Illustrative examples of UV absorbers include derivatives of benzotriazole such as those known under the trade designations TINUVIN Brand 327, 328, 900, 1130, and TINUVIN-P Brand, available from Ciba-Geigy Corporation, Ardsley, N.Y.; chemical derivatives of benzophenone such as those known under the trade designations UVINUL-M40, 408, D-50, available from BASF Corporation, Clifton, N.J.; SYNTASE Brand 230, 800, and 1200 available from Neville-Synthese Organics, Inc., Pittsburgh, Pa.; or chemical derivatives of diphenylacrylate such as UVINUL-N35 and 539, also available from BASF Corporation of Clifton, N.J. Light stabilizers that may be used include hindered amines, which are typically used at about 0.5 to 2 weight percent. Illustrative examples of hindered amine light stabilizers include those known under the trade designations TINUVIN-144, 292, 622, 770, and CHIMASSORB-944, all available from the Ciba-Geigy Corp., Ardsley, N.Y. Free radical scavengers or antioxidants may be used, typically, at about 0.01 to 0.5 weight percent. Illustrative examples of suitable antioxidants include hindered phenolic resins such as those known under the trade designations IRGANOX-1010, 1076, 1035, and MD-1024, and IRGAFOS-168, all available from the Ciba-Geigy Corp., Ardsley, N.Y. Small amounts of other processing aids, typically no more than one percent by weight of the polymer resins, may be added to improve the resin's processibility. Useful processing aids include fatty acid esters, or fatty acid amides available from Glyco Inc., Norwalk, Conn., metallic stearates available from Henkel Corp., Hoboken, N.J., or WAX E available from Hoechst Celanese Corporation, Somerville, N.J.

EXAMPLE

Features and advantages of this invention are further explained in the following illustrative examples. All parts and percentages herein are by weight unless otherwise specified; "gsm" designates grams per square meter.

Microstructured Member

Molten polycarbonate resin (known under the trade designation MAKOLON Brand 2407, supplied by Mobay Corporation (now Bayer), Pittsburgh, Pa.) was cast onto a heated microstructured nickel tooling containing cube corner recesses having a depth of approximately 89 micrometers (3.5 mils). The recesses were formed as matched pairs of cube corner elements with the optical axis canted or tilted 8.15 degrees away from the primary groove, as generally described in U.S. Pat. No. 4,588,258 (Hoopman). The nickel tooling thickness was 508 micrometers (20 mils) and the tooling was heated to 215.6° C. (420° F.). Molten polycarbonate at a temperature of 288° C. (550° F.) was cast onto the tooling at a pressure of approximately $1.03 \times 10^7$ to $1.38 \times 10^7$ pascals (1500 to 2000 pounds/square inch) for 0.7 seconds in order to replicate the microcube recesses. Coincident with filling the cube recesses, additional polycarbonate was deposited in a continuous land layer above the tooling with a thickness of approximately 104 micrometers (4 mils).

A previously extruded 75 micrometer (3 mils) thick aliphatic polyester polyurethane body layer, MORTHANE PNO3.214, available from Morton International, Seabrook, N.H., was then laminated onto the top surface of the continuous polycarbonate land layer when the surface temperature was approximately 191° C. (375° F.). The combined laminated polycarbonate and polyurethane microstructured member was then cooled with room temperature air for 18 seconds to a temperature of about 70° C. to 85° C. (160° F. to 190° F.), allowing the materials to solidify. The laminate was then removed from the tooling.

Lamination Strength

The strength of the melt-bond between the microstructured member and the sealing layer may be measured using a T-peel test. The T-peel test used herein is based on American Society for Testing and Materials (ASTM) test number D 1876-93 except with the changes noted herein. The samples were cut into strips about 25 mm (1 inch) wide with the RF or thermal weld parallel to the length dimension of the strip. Jaw separation rate was 305 mm/min (12 inches/min). Peak and average peel forces are reported, since the peel front travels about 20 mm along the bond.

Example 1

An open weave polyester fibrous material comprising 1000 denier fibers, 3.5 ends per cm (9 ends per inch) in each direction, having a basis weight of about 95 gsm (2.8 ounces per square yard) from Milliken Co., Spartanburg, S.C., was used as the fibrous web of the backing member. This woven fibrous material had openings which allowed flow of molten thermoplastic resins therethrough. Onto one major surface of the fibrous material was heat laminated a previously extrusion coated non-compatible EAA layer (153 micrometer thick (6 mils)) to form a matrix layer. The EAA was obtained from Dow Chemical Co., in pellet form, under the trade designation PRIMACOR 3440. Onto the second major surface of the fibrous material was heat laminated a previously extrusion coated a 63.5 micrometer (2.5 mils) thick polyurethane layer as a sealing layer. The polyurethane was obtained in pellet form from Thermedics Co., of Woburn, Mass., and comprised titanium dioxide-pigmented aliphatic polyester polyurethane of 93 Shore A hardness.

Five of these sealing layer/backing member composites were produced for bonding to the aforementioned retroreflective sheet and subsequent T-peel testing, with the pigmented polyurethane layer being melt-bonded to the microstructured surface of separate pieces of the retroreflective sheet.

Example 2

Two sealing layer/backing member composites were made as in Example 1 except that the polyurethane layer was 127 micrometer (5 mils) thick.

Example 3

Four sealing layer/backing member composites for bonding to the retroreflective sheet and subsequent T-peel testing were made as in Example 1 except that the polyurethane was a blend of 60 weight percent aliphatic polyester polyurethane known under the trade designation MORTHANE PNO3.214, available in pellet form from Morton International, Seabrook, N.H., with 40 weight percent of a pigmented aromatic polyether polyurethane (the pigmented aromatic polyether polyurethane comprising 50 weight percent titanium dioxide, and 50 weight percent aromatic polyether polyurethane known under the trade designation ESTANE 58810 from B.F. Goodrich Co., Cleveland, Ohio, which had been previously compounded in a twin screw extruder and pelletized).

Example 4

Four sealing layer/backing member composites for bonding to the retroreflective sheet and subsequent T-peel testing were made as in Example 3 except that the polyurethane layer had a thickness of 114 micrometer (4.5 mils).

Examples 5A–5D

Four sealing layer/backing member composites were made as in Example 1 except that the polyurethane layer was replaced by an extruded dual layer film in which one layer comprised EAA and the second layer comprised EVA, wherein the percentage of vinyl acetate in the EVA layer was as indicated in Table 1. The EAA side of the dual layer film was laminated to the second major surface of the composite. The thickness of the EAA layer in each articles was 50 micrometers (2 mils), while the EVA layer thickness was 12 micrometers (0.5 mil) for the articles of Examples 5A and 5B, and 25 micrometers (1 mil) for the articles of Examples 5C and 5D.

Example 6

The articles of this example were identical to those of Example 4 except that both major surfaces of the composite had the polyurethane coating. Three of these samples were produced for bonding and T-peel testing.

Example 7

In these constructions, a polymer-coated nylon woven fibrous material of tight weave manufactured by Burlington Industries, known under the trade designation ULTREX, was employed. This polymer-sealed fabric had an as-coated basis weight of about 4.5 ounces per square yard (about 150 gsm) and had 60×120 ends per inch (152×304 ends per cm), which comprised nylon fibers having about 200 denier. The matrix layer on one major surface of the fibrous web allowed water vapor to pass through the polymer-coated fibrous material, but did not allow liquid water to pass through. To the non-coated side was heat laminated the polyurethane discussed in Example 3, to a thickness of 114 micrometers (4.5 mils) to form a sealing layer. Three of these constructions were produced for bonding and T-peel testing.

Example 8

In these constructions, a woven nylon fibrous material having about 152 ends per cm (60 ends per inch) in both directions, and a basis weight of about 107 gsm (about 3.2 ounces per square yard) was used as the backing member. To one major surface was heat laminated the polyurethane of Example 3, at a thickness of 114 micrometers (4.5 mils) to form a sealing layer. Two of these samples were made.

Example 9

The sealing layer was made as follows. A blend of 60% aliphatic polyester polyurethane (MORTHANE Brand PNO3-214) and 40% aromatic polyester polyurethane was fed into an extruder and extruded on a PET carrier film. This aromatic polyurethane comprised a mixture of 50% ESTANE Brand 58110 aromatic polyester polyurethane from B.F. Goodrich, Clevland, Ohio, and 50% titanium dioxide. The mixture was previously compounded in a twin screw extruder and pellitized. The extruded sealing layer was 64 micrometer thick (0.0025 in). The PET carrier film was 51 micrometer thick (0.002 in).

The microstructured member and the sealing layer were fed into a nip created between a steel embossing roll and a rubber roll having a 75 Shore A durometer. The microstructured member was allowed to contact the embossing roll with the cube corner side exposed. The PET film of the sealing layer was allowed to contact the rubber roll so that the sealing layer is exposed. The steel embossing roll was heated to 243° C. (470° F.). The rolls turned at a speed of 1.52 meters/min. (5 feet/min.) and the force on the nip was about 86 N/cm (50 lb/in) to create bonds between the cube-corners and the exposed sealing member. The resultant product as a retroreflective sheet.

A backing member was made as described in Example 1 except that the non-compatible EAA layer was not used. The polyurethane film and the polyester fibrous material were fed into a nip with polyurethane film contacting the hot can and the polyester contacting a rubber roll. The lamination of the two films occurred at a temperature of 104 to 116° C. (220 to 240° F.), a line speed of 6 to 12 meters/min. (20 to 40 feet/min.), and a nip pressure of 12 to 26 N/cm (7 to 15 lb/in). The resultant backing member had the scrim partially embedded into the polyurethane film.

The retroreflective sheet was laminated to the backing member to produce an article of the present invention. The backing member was allowed to contact a hot can with the scrim side exposed. The retroreflective sheet was allowed to contact a rubber roll with the sealing layer exposed. The lamination of the two films occurred at a temperature of 104 to 116° C. (220 to 240° F.), a line speed of 3 to 12 meters/min. (10 to 40 feet/min.), and a nip pressure of 12 to 24 N/cm (7 to 14 lb/in).

Comparative Example A

A polymer-coated fabric known under the trade designation DURASKIN, style number B156035, available from Verseidag-Indutex GmgH, Krefeld, Germany, was used as the backing member. This coated fabric had a woven polyester scrim of 610 grams per sq. meter (18 oz/yd$^2$), coated on both sides with a highly monomericly plasticized polyvinyl chloride as the matrix layer. Four of these coated fabrics were bonded and tested in the T-peel test.

Comparative Example B

In this example, a polymer-coated fabric was made as in Example 1 except that the polyurethane layer was replaced with an extruded EAA layer identical to that coated on the first major surface. One of this type was made.

Comparative Example C

A commercially available retroreflective article from Reflexite Corporation, believed to have the trade designation 393-2457-372, was employed. This was a PVC containing cube-corner layer, adhered (melt-bonded) to a PVC-coated scrim.

Assembly

Some of the sealing layer/backing member composites from Examples 1–8 (as indicated in Table 1) were layered together with separate pieces of the retroreflective sheet with the compatibilizing layer facing the cube corners and thermally welded in a line pattern about 4 mm wide by 180 mm long. The samples were thermally welded in a heated platen press in which an aluminum plate with a raised ridge (3 mm high by 2.8 mm wide by 180 mm long) was attached to the upper platen. The retroreflective layer in each was protected by a 25 micrometer polyester terephthalate film next to the sealing ridge. The backing member was also protected by a 51 micrometer polyester terephthalate film next to the bottom platen. The platens were preheated to 160° C. (320° F.), the samples placed in the press and the press was closed width a force of 35,000 Newtons (8000 lb$_f$) and held closed for 3 to 5 seconds before opening and removing the sample. The polyester terephthalate protective layers were then removed from the samples. Table 1 indicates which samples were thermally bonded. Alternatively, the nip between a steel embossing roll and a rubber roll may be used to effect the thermal attachment. The steel roll is typically heated, and has a chain link pattern as illustrated in FIG. 8.

All samples from Examples 1–8 and Comparative Examples A, B, and C were also layered together with separate pieces of laminate as described in Example 1, with the sealing layer facing the cube-corners. The samples were welded using a bar shaped die, 3.2 mm (0.125 inch) in width, and about 2.54 cm (1 inch) in length. Approximately 1 to 2 kW radio frequency power was used at a frequency of 27.12 Mhz. The generator power indicated in Table 1 is actually expressed as a percentage of 4 kilowatts. For example, the first table entry is 42 percent of 4 kilowatts, or 1.7 kilowatts. The welding equipment was set at the conditions indicated in Table 1. The pressure exerted during welding was about 2000 psi (about 1.4 Newton/cm$^2$) and the gap between the die elements of the welding machine was either 0.5 mm (2 mils), or (about 0.25 mm (1 mil) (identified as "L" for large and "S" for small, respectively). The (RF) welding equipment used was obtained from Thermatron, Electronics Division of Wilcox and Gibbs, New York, N.Y.

The composite retroreflective articles were then tested for bond strength according to the T-peel test previously described and the results are given in Table 1. In Table 1 it can be seen that the peak and average T-peel force was generally higher for the inventive articles. Where the T-peel was high for a comparative article, failure was cohesive (within the coating of the polymer-coated fabric) which is not desired.

TABLE 1

| | | RF Sealing | | | | | | | THERMAL SEALING | | |
|---|---|---|---|---|---|---|---|---|---|---|---|
| Example | TOP BOTTOM | GEN. POWER | TIME (SEC) | PLATE AMP. | GAP | PEAK N | AVG N | FAIL MODE | PEAK N | AVG. N | FAIL MODE |
| 1 | T | 42 | 3 | 0.456 | L | 5.3 | 3.6 | RF | 8.0 | 5.3 | RF |
|   | T | 48 | 3 | 0.513 | L | 9.3 | 6.2 | RF |   |   |   |
|   | T | 45 | 3 | 0.456 | S | 9.8 | 7.1 | RF |   |   |   |
|   | T | 50 | 3 | 0.532 | S | 10.7 | 8.5 | RF |   |   |   |
|   | T | 42 | 3 | 0.456 | S | 13.3 | 10.2 | RF |   |   |   |
| 2 | T | 38 | 3 | 0.399 | L | 16.0 | 12.9 | RF/RC | 7.6 | 5.3 | RC |
|   | T | 42 | 3 | 0.456 | L | 25.4 | 17.3 | RF |   |   |   |
| 3 | T | 45 | 3 | 0.475 | L | 5.3 | 3.1 | RF | 8.0 | 4.9 | RF |
|   | T | 45 | 3 | 0.475 | S | 5.3 | 4.0 | RF |   |   |   |
|   | T | 50 | 3 | 0.532 | S | 8.9 | 5.3 | RF |   |   |   |
|   | T | 45 | 3 | 0.475 | L | 10.2 | 6.2 | RF |   |   |   |
| 4 | T | 38 | 5 | 0.399 | L | 8.5 | 5.8 | RF | 12.0 | 7.6 | RF/RC |
|   | B | 45 | 3 | 0.475 | L | 10.2 | 7.1 | RF |   |   |   |
|   | T | 42 | 5 | 0.456 | S | 12.5 | 8.9 | RF |   |   |   |
|   | T | 42 | 3 | 0.456 | L | 15.1 | 9.8 | RF |   |   |   |
| 5A | T | 55 | 3 | 0.57 | S | 2.2 | 1.3 | CO | 3.6 | 1.8 | RC |
| 5B | T | 50 | 3 | 0.532 | S | 1.8 | 1.3 | CO | 3.1 | 1.8 | RF |
| 5C | T | 50 | 3 | 0.532 | S | 0.4 | 0.4 | RC | 0.4 | 0.4 | RC |
| 5D | T | 55 | 3 | 0.57 | S | 0.9 | 0.4 | RC |   |   |   |

| | | RF Sealing | | | | | | | THERMAL SEALING | | |
|---|---|---|---|---|---|---|---|---|---|---|---|
| Example | TOP BOTTOM | POWER | TIME (SEC) | AMP. | GAP | PEAK N | AVG N | FAIL MODE | PEAK N | AVG. N | FAIL MODE |
| 6 | T | 25 | 3 | 0.266 | L | 3.1 | 1.8 | RC | 13.8 | 8.0 | RF |
|   | T | 28 | 3 | 0.285 | L | 11.6 | 6.7 | RC |   |   |   |
|   | T | 29 | 3 | 0.304 | L | 21.8 | 15.1 | RF |   |   |   |
| 7 | T | 38 | 3 | 0.418 | L | 9.8 | 7.1 | RF | 10.7 | 8.5 | RF/RC |
|   | B | 35 | 3 | 0.38 | L | 10.7 | 9.3 | RF |   |   |   |
|   | T | 35 | 3 | 0.38 | L | 12.9 | 9.8 | RF |   |   |   |
| 8 | T | 35 | 3 | 0.38 | L | 5.3 | 4.0 | RF | 6.2 | 4.4 | RF/RC |
|   | B | 35 | 3 | 0.38 | L | 16.0 | 13.8 | RF |   |   |   |
| A | T | 26 | 3 | 0.266 | L | 0.4 | 0.4 | RC |   |   |   |

TABLE 1-continued

|   |   |   |   |   |   |   |   |   |
|---|---|---|---|---|---|---|---|---|
|   | B | 26 | 3 | 0.266 | L | 0.9 | 0.4 | CO |
|   | B | 30 | 3 | 0.304 | L | 2.2 | 1.8 | CO |
|   | T | 30 | 3 | 0.304 | L | 4.4 | 2.7 | CO |
| B | T | 55 | 3 | 0.57  | L | 0.0 | 0.0 | RC |
| C |   |    |   |       |   | 1.3 | 0.9 | CO |

Failure Mode:
RF release from fabric
RC release from cubes
CO cohesive within compatibilizing layer Various modifications and alterations of this invention will become apparent to those skilled in the art without departing from the scope and spirit of this invention.

What is claimed is:

1. A method of making a microstructured article with backing member, said method comprising:
   (a) providing a microstructured member that comprises (1) a body layer and (2) a microstructured layer comprising an array of microstructured elements, wherein at least one of said microstructured elements and the portion of said body layer closest to said microstructured layer comprises a first polymer;
   (b) providing a sealing layer having first and second surfaces and comprising a second polymer, and melt-bonding at least a portion of said sealing layer's first surface to said microstructured member;
   (c) providing a backing member comprising (1) a fibrous web containing a plurality of strands, each strand having a multitude of filaments and (2) a matrix layer having a first surface, said fibrous web disposed on said matrix layer's first surface; and
   (d) melt-bonding said matrix layer's first surface to said sealing member's second surface such that said fibrous web (1) is substantially not melt bonded to either said sealing layer or said matrix layer and (2) is encapsulated between said sealing layer and said matrix layer without impregnating said strands so as to allow at least some of said filaments within a strand to move freely with respect to one another.

2. The method of claim 1 wherein said microstructured elements are selected from the group consisting of cube corner elements and prisms.

3. The method of claim 1 wherein at least part of said sealing layer is melt-bonded to at least one of said body layer and said microstructured layer.

4. The method of claim 1 wherein at least a portion of said microstructured layer is specularly coated or metallized.

5. The method of claim 1 wherein said first polymer is selected from the group consisting of acrylic, polycarbonate, polyester, polyurethane, and crosslinked acrylates.

6. The method of claim 1 wherein said first polymer has a higher melting point than said second polymer.

7. The method of claim 1 wherein said body layer is a flexible, ultraviolet light absorbing overlay.

8. The method of claim 1 wherein said sealing layer comprises a polymer having a dielectric loss factor greater than about 0.06.

9. The method of claim 1 wherein said sealing layer comprises polymers selected from the group consisting of polyurethane, ethylene methyl acrylate copolymer, ethylene n-butyl acrylate copolymer, ethylene ethyl acrylate copolymer, ethylene vinyl acetate copolymer, and polyvinyl chloride containing a polymeric plasticizer.

10. The method of claim 1 wherein said sealing layer comprises a polymer suitable as a barrier to migration of a monomeric plasticizer.

11. The method of claim 1 wherein said sealing layer encapsulates portions of said microstructured member in a regular pattern of sealed cells.

12. The method of claim 1 wherein said sealing layer and said microstructured member are bonded together sufficiently strongly that a T-peel force of at least about 9 Newtons (2 lb$_f$) is required to separate the layers.

13. The method of claim 1, wherein said fibrous web is selected from the group consisting of woven webs, non-woven webs, knitted webs, and mats of loose strands.

14. The method of claim 1, wherein at least some of said strands comprise filaments that are entwined or twisted together.

15. The method of claim 1, wherein said matrix layer comprises polymers selected from the group consisting of highly monomeric plasticized PVC, ethylene acrylic acid copolymer, and polyurethane.

16. The method of claim 1 wherein said first polymer, said second polymer, and said fibrous web each comprise a different polymer.

* * * * *